United States Patent
Okabe

(10) Patent No.: US 8,294,928 B2
(45) Date of Patent: Oct. 23, 2012

(54) DATA MANAGEMENT SYSTEM TO EXTRACT TEXT DATA

(75) Inventor: Kouya Okabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1143 days.

(21) Appl. No.: 11/769,590

(22) Filed: Jun. 27, 2007

(65) Prior Publication Data

US 2008/0016506 A1 Jan. 17, 2008

(30) Foreign Application Priority Data

Jul. 3, 2006 (JP) .................................. 2006-183015

(51) Int. Cl.
*G06G 3/12* (2006.01)

(52) U.S. Cl. ...... 358/1.15; 358/1.13; 358/462; 358/403; 382/305; 382/306; 382/317; 382/321; 382/140

(58) Field of Classification Search ................. 358/1.15, 358/462, 403, 1.13; 382/305–306, 317, 321, 382/140, 190
See application file for complete search history.

(56) References Cited

U.S. PATENT DOCUMENTS

| | | | | |
|---|---|---|---|---|
| 5,907,835 A | * | 5/1999 | Yokomizo et al. | 1/1 |
| 6,128,616 A | * | 10/2000 | Shiiyama | 726/27 |
| 6,678,683 B1 | * | 1/2004 | Shiiyama | 1/1 |
| 2003/0179400 A1 | * | 9/2003 | Kofman et al. | 358/1.13 |
| 2004/0218836 A1 | * | 11/2004 | Kanatsu | 382/305 |
| 2005/0226507 A1 | * | 10/2005 | Guo et al. | 382/182 |
| 2006/0119887 A1 | * | 6/2006 | Aritomi et al. | 358/1.15 |
| 2007/0019222 A1 | * | 1/2007 | Oda et al. | 358/1.13 |
| 2007/0070443 A1 | * | 3/2007 | Kim | 358/462 |
| 2007/0133020 A1 | * | 6/2007 | Uejo et al. | 358/1.9 |

FOREIGN PATENT DOCUMENTS

| | | |
|---|---|---|
| JP | 11-120202 A | 4/1999 |
| JP | 2000-335059 A | 12/2000 |
| JP | 2002-149371 A | 5/2002 |
| JP | 2003-016070 A | 1/2003 |
| JP | 2004-334341 A | 11/2004 |

* cited by examiner

*Primary Examiner* — Jacky X Zheng

(74) *Attorney, Agent, or Firm* — Canon USA, Inc., IP Division

(57) ABSTRACT

A data management system includes a client apparatus, an image processing server, and a database. The client apparatus sets whether to extract text data from a print rendering command. According to the data management system, an appropriate text extraction method can be set according to an application. When a setting for extracting text data from a print rendering command has been performed, text data is extracted from a print rendering command output during print processing by the application. The extracted text data is sent to the image processing server together with printed image data. On the other hand, when a setting for extracting text data from a print rendering command has not been performed, the printed image data is sent to the image processing server. If no text data is received from the client apparatus, the image processing server performs optical character recognition processing on the printed image data to extract text data.

14 Claims, 10 Drawing Sheets

DATA MANAGEMENT SYSTEM TO EXTRACT TEXT DATA

BACKGROUND OF THE INVENTION

1. Field of the Invention

The present invention relates to a data management system configured to store a job that a user has executed on a digital multifunction peripheral or a printer.

2. Description of the Related Art

In recent years, digital multifunction peripherals (MFPs) and printers have been widely used. Due to availability of MFPs and printers, users can easily print, copy, or send a document, regardless of their skills. The wide-spread use of digital MFPs and printers enhances the convenience of users, but also allows confidential documents to be easily printed, copied, and transmitted, which increases the risk of information leakage.

In this regard, a conventional document management system stores all processed job data (image data and text data) in performing processing such as printing, copying, and data transmission via facsimile or e-mail, in a server (a storage device). In such a system, an administrator can search a desired document from the stored data to trace what processing was performed by which apparatus on what date and time. Accordingly, if information leakage occurs, the leaked document can be searched to specify (trace) how the document was leaked. Thus, information leakage can be restrained.

Furthermore, the processed image data and text data can be stored associated with each other so that data stored in the server can be easily searched. A full-text search can be performed on the text data to search the job data. For example, a system auditor can perform a full-text search on the stored data using a term "confidential information" as a search term. As a result, job data including the search term can be obtained.

Job data (document data) stored in the server can be of various formats such as data for a print job, copy job, and facsimile job.

Japanese Patent Application Laid-Open No. 11-120202 discusses a method for inputting and centrally managing a plurality of documents of different data formats to enable a seamless search. In the method discussed by Japanese Patent Application Laid-Open No. 11-120202, documents of different data formats (such as an application document, a World Wide Web (WWW) document, and a facsimile document) are processed, a predetermined document structure file is generated from each document, and the generated document structure file is stored. The document structure file includes an original document file, a text file generated from the original document file, a thumbnail file, and a document management file for managing each document structure file. By using such document structure file, the method enables integrated management of a plurality of documents of different data formats.

In the method discussed in Japanese Patent Application Laid-Open No. 11-120202, the document structure file including the text file generated based on the original file is stored in a document structure file storage unit. Furthermore, one search text file generated by extracting only a text file from the document structure file stored in the document structure file storage unit is stored in a document management unit.

In the above-described method, when a text file is input as an original document, a document structure file including an original document file and a text file generated based on the original document is stored. Additionally, a text file for searching is generated and stored. Consequently, the text file is redundantly generated, and the same text file is duplicatedly stored.

In a system which stores a job that a user has executed on a digital MFP or a printer, when a printer prints application data, a printer driver can extract and store text data based on a text rendering command. However, in this method, a text cannot be extracted in the case of an application with which a text is printed as an image instead of printing a text using a text rendering command. Consequently, in a certain case, more appropriate text data can be obtained by performing optical character recognition (OCR) on the generated image data to extract a text.

SUMMARY OF THE INVENTION

An embodiment of the present invention is directed to a document management system in which a text extraction method can be changed according to a job or an application. Accordingly, text data appropriate for use in a search can be extracted. Moreover, text data is not redundantly registered on a database server for one job.

According to an aspect of the present invention, an embodiment is directed to a data management system including a client apparatus, an image processing server and a database. The client apparatus includes: a setting unit configured to set whether text data is to be extracted from a print rendering command output during a print processing by an application; an extraction unit configured to extract, when a setting has been performed by the setting unit for extracting text data, text data from the print rendering command output during the print processing by the application; and a sending unit configured to perform, when a setting has been performed for extracting text data by the setting unit, control to send the text data extracted by the extraction unit and image data that has been printed, to the image processing server, and when the setting for extracting text data has not been performed by the setting unit, perform control to send the printed image data to the image processing server. The image processing server includes: an optical character recognition unit configured, if it is determined that no text data has been sent from the client apparatus, to perform optical character recognition processing on the printed image data to extract text data; and a registration unit configured to register the text data extracted by the extraction unit or the optical character recognition unit on the database by associating the text data with the image data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

Figure 1:
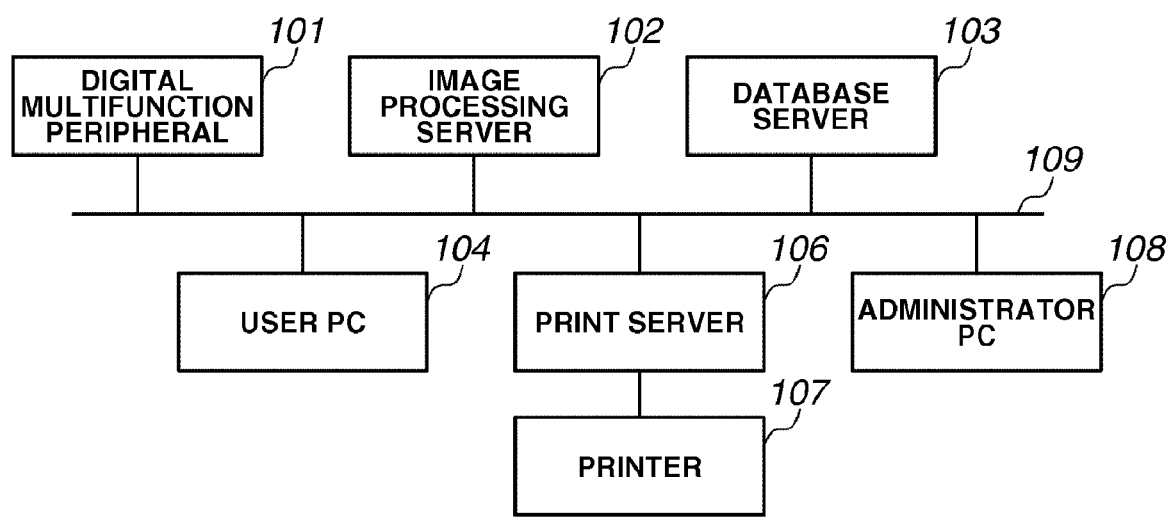
FIG. 1 illustrates a configuration of a data management system according to an exemplary embodiment of the present invention.

FIG. 1 illustrates a configuration of a data management system according to an exemplary embodiment of the present invention. Referring to FIG. 1, an image processing apparatus (e.g., a digital MFP 101), an image processing server 102, a database server 103, a client apparatus (e.g., a user PC (also referred to herein as a client PC) 104), a print server 106, a printer 107, and an administrator PC 108 are in communication with one another via a network 109.

The digital MFP 101 includes functions such as a scan function, a print function, a copy function, an e-mail-transmission function, and a facsimile-transmission function. In addition, when the digital MFP 101 executes a job, the digital MFP 101 generates electronic image data of the job and performs resolution conversion on the generated image data. The digital MFP 101 temporarily stores the converted image data in its storage device, and transfers the temporarily stored image data later to the image processing server 102 at regular time intervals.

A printer driver is installed in the user PC 104. When print processing is performed (i.e., when a print job is executed), the printer driver generates electronic image data of the job and generates text data by extracting text information from a text rendering command. The user PC 104 immediately transfers the generated image data and text data to the image processing server 102 or temporarily stores the image data and text data in a storage device of the user PC 104 and transfers the stored image data and text data to the image processing server 102 at regular intervals.

With respect to the printer driver, a printer driver installed in the print server 106 can be shared and installed in the user PC 104. In such a case, tracing data (image data and text data) for the electronic data instructed to be printed by the user PC 104 is stored in the print server 106. Subsequently, the print server 106 transfers the tracing data (image data and text data) to the image processing server 102 at regular intervals. In the exemplary embodiments described below, a configuration in which the above-described processing is performed without using the printer server 106 is described. However, the present invention is not limited to this configuration. That is, the processing can also be performed via the print server 106.

The image processing server 102 performs image conversion and resolution conversion on the image data transferred from the digital MFP 101 and the print server 106. The data is converted into a format with which the image data can be stored in the database server 103. If an administrator has set the image processing server 102 to perform optical character recognition (OCR), the image processing server 102 performs OCR processing and extracts text data from the image data. The image processing server 102 registers the processed image data in the database server 103 in the order of processing. Furthermore, the image processing server 102 sets text data corresponding to the image data on the database server 103 as text to be used in a full-text search for the image.

The administrator PC 108 is a client PC used by a system administrator (auditor) to access a database server 103 to audit whether information leakage has occurred. In an embodiment, the network 109 comprises a local area network (LAN). It is noted that various network configurations may be employed. For example, the network 109 may be realized by the Internet, a wide area network (WAN) and/or a LAN.

Figure 2:
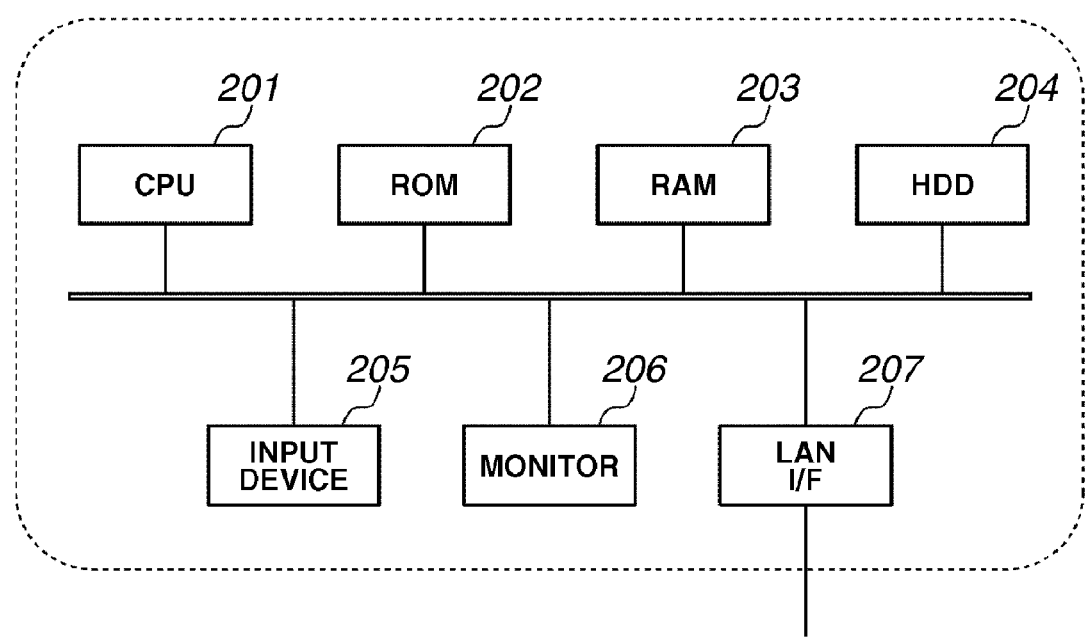
FIG. 2 illustrates a configuration of each personal computer (PC) according to an exemplary embodiment of the present invention.

FIG. 2 illustrates an exemplary hardware configuration of the user PC 104, the image processing server 102, the database server 103, the print server 106, and the administrator PC 108. All of the above devices in the present exemplary embodiment can be a general-purpose PC such as an IBM-Personal Computer/Advanced Technology (PC/AT) compatible machine. Therefore, the hardware configuration is illustrated using the same block diagram.

Referring to FIG. 2, a central processing unit (CPU) 201 directly or indirectly controls each device (such as a read only memory (ROM) and a random access memory (RAM) which will be described later) connected with each other via an internal bus. The CPU 201 executes a program according to the present exemplary embodiment.

A ROM 202 stores basic software such as a basic input/output system (BIOS). A RAM 203 is used as a work area for the CPU 201. Furthermore, the RAM 203 is used as a temporarily storing device to load a program according to the present exemplary embodiment.

A hard disk drive (HDD) 204 stores the above-described program. An input device 205 receives input from a user performed in the above-described program. A monitor 206 displays an operation screen. A LAN interface (I/F) 207 is a network interface used for performing connection to a network.

Figure 3:
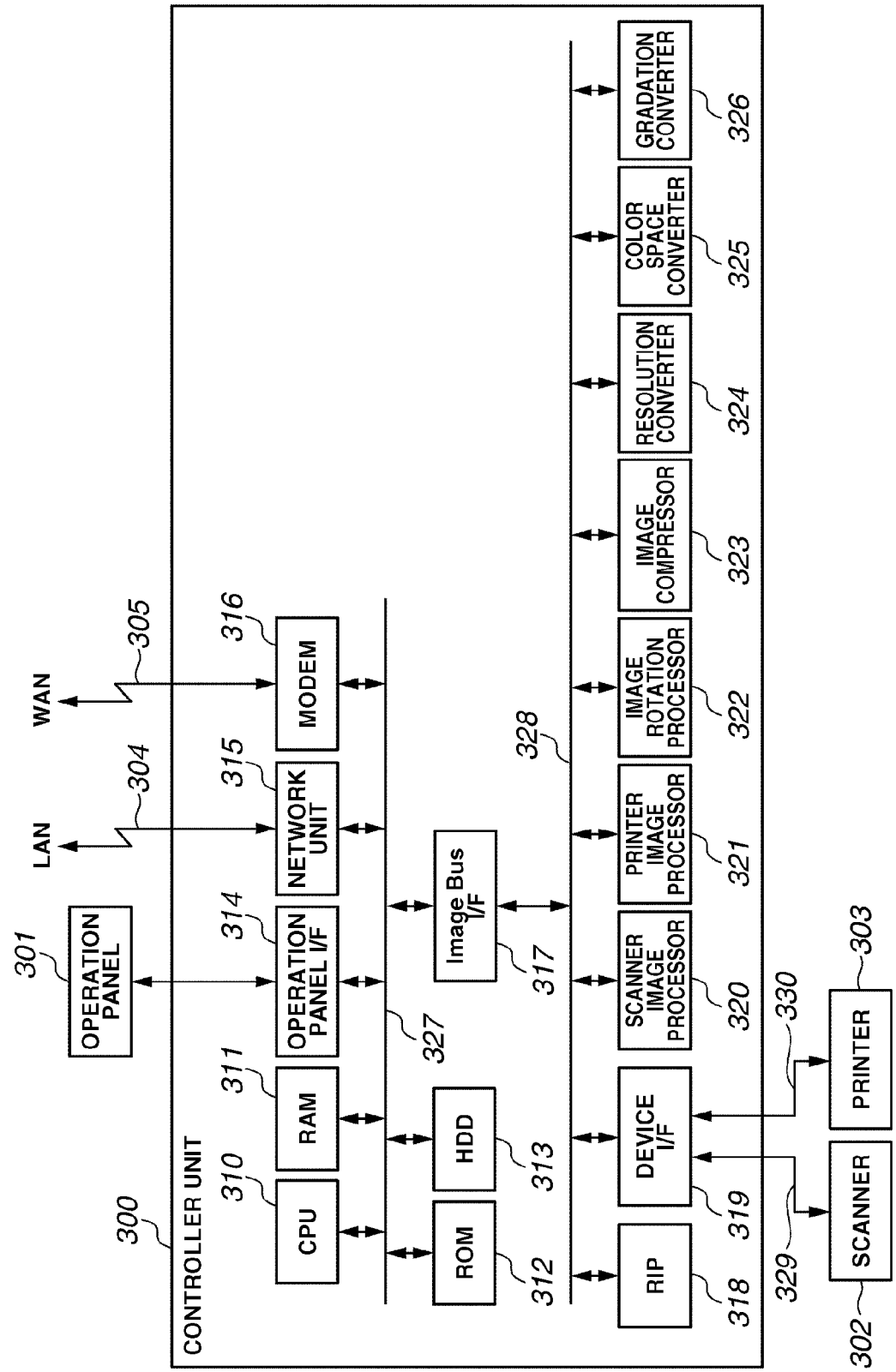
FIG. 3 illustrates a configuration of a digital MFP according to an exemplary embodiment of the present invention.

FIG. 3 illustrates an exemplary configuration of the digital MFP 101 illustrated in FIG. 1.

Referring to FIG. 3, a controller unit 300 is in communication with a scanner 302, i.e., an image input device, and a printer 303, i.e., an image output device. The controller unit 300 is also in communication with a network (LAN) 304 and a public line (wide area network (WAN)) 305. The controller unit 300 inputs and outputs image information and device information using such interfaces.

The controller unit 300 includes a CPU 310, which controls the entire system. A RAM 311 is a system work memory on which the CPU 310 operates, and serves also as an image memory (buffer memory) for temporarily storing input image data. A ROM 312 is a boot ROM and stores a boot program of the system. An HDD 313 stores system software, log information of a job, and image data.

An operation panel I/F 314 is an interface to the operation panel 301 and outputs image data to be displayed on the operation panel 301. In addition, the operation panel I/F 314 sends information input by an operator via the operation panel 301 to the CPU 310.

A network unit 315 is connected to the network (LAN) 304 to exchange information with external devices connected to the network 304. A modem 316 is connected to the public line (WAN) 305 to exchange information with external devices. The above-described devices are connected via a system bus 327.

An image bus I/F 317 is a bus bridge that connects the system bus 327 with an image bus 328 used for transferring image data at a high speed and converting data structure. The image bus 328 includes a peripheral component interconnect (PCI) bus or Institute of Electrical and Electronic Engineers (IEEE) 1394. The following devices are in communication with one another on the image bus 328.

A raster image processor (RIP) 318 rasterizes page description language (PDL) code into a bit map image. A device I/F 319 connects the scanner 302 (the image input device), printer 303 (the image output device), and controller 300 via an image input unit I/F 329 and a printing unit I/F 330. The device I/F 319 performs synchronous/asynchronous image data conversion.

A scanner image processor 320 corrects, processes, and edits input image data. Furthermore, the scanner image processor 320 determines whether the input image data is data of a color document or data of a monochromatic document according to a color saturation signal of the image data. The scanner image processor 320 stores a result of the determination. A printer image processor 321 corrects, processes, and edits output image data.

An image rotation processor 322 operates in collaboration with the scanner image processor 320 to rotate image data as the image is read with the scanner 302 and store the image data on a memory. Moreover, the image rotation processor 322 can rotate image data stored on the memory and re-store the image data on the memory, and the image rotation processor 322 can rotate and print out image data stored on the memory in an interlocking operation with the printer image processor 321.

An image compressor 323 performs Joint Photographic Experts Group (JPEG) compression and decompression on multi-valued image data, and Joint Bi-level Image Experts Group (JBIG), Modified Modified Read (MMR), Modified Read (MR), and Modified Huffman (MH) compression and decompression on binary image data. A resolution converter 324 performs resolution conversion on image data stored on the memory and stores the converted data on the memory.

A color space converter 325 uses matrix computation to, for example, convert YUV image data on the memory into Lab image data, and stores the converted image data on the memory. A gradation converter 326 converts image data of 8 bits and 256 gradations stored on the memory into image data of 1 bit and two gradations using error diffusion processing, and stores the converted image data on the memory.

The image rotation processor 322, the image compressor 323, the resolution converter 324, the color space converter 325, and the gradation converter 326 can operate interlocking with each other. For example, when image rotation and resolution conversion are to be performed on image data stored on the memory, both the image rotation processor 322 and the resolution converter 324 can perform the processing without using the memory.

Figure 4:
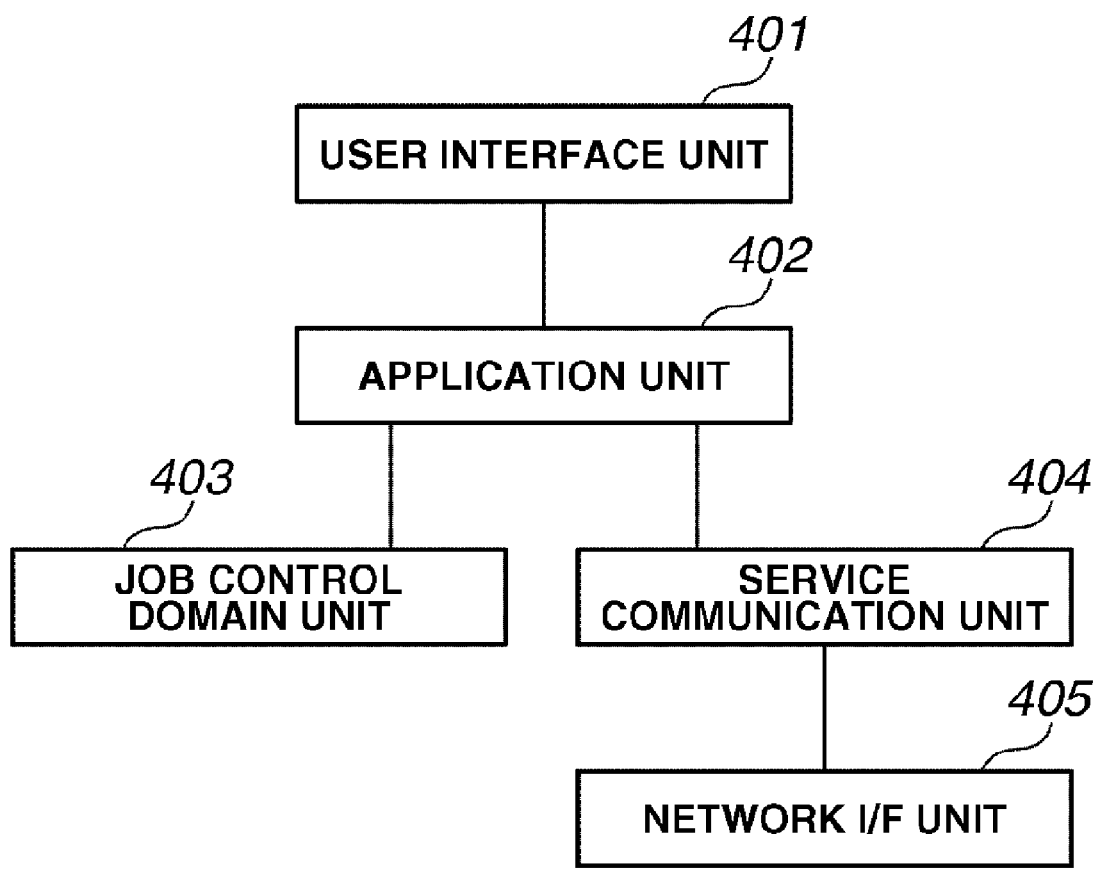
FIG. 4 illustrates a functional configuration of software of a digital MFP according to an exemplary embodiment of the present invention.

FIG. 4 illustrates a functional configuration of system software in the controller unit 300 of the digital MFP 101. Referring to FIG. 4, a user interface (UI) unit 401 supplies an operator instruction to an application unit 402. In addition, the UI unit 401 receives the processing result from the application unit 402 and generates a screen which is displayed on the operation panel 301.

The application unit 402 performs a process in response to a request from the user UI unit 401. For example, when copying is requested, the application unit 402 inputs a copy job on which a specified copy setting is performed, into a job control domain unit 403. The application unit 402 then receives information such as device status information and job status information from the job control domain unit 403. Furthermore, in the case where the application unit 402 sends log information and log image data of the job to the image processing server 102, the application unit 402 receives the log information and the log image data of the job from the job control domain unit 403. The application unit 402 then requests a service communication unit 404 to send the log information and image data for tracing (log image data) of the job and receives the processing result.

The job control domain unit 403 controls the processing of a plurality of jobs such as a scan job, a copy job, a print job, and a facsimile transmission job. For example, when a copy job is input, the job control domain unit 403 operates the scanner 302 and the printer 303 according to the specified copy setting to scan a document and print image data obtained by the scanning.

Moreover, when a job for inputting an image into the digital MFP 101 (an input job) is executed, the job control domain unit 403 generates image data for tracing (i.e. image data for storing log) together with log information of the job. The job control domain unit 403 stores the generated log information and tracing image data of the job on an HDD. The image data for tracing stored on the database server 103 can be a duplication of the image data of the job, or can be converted into specific resolution, a color space, or a compression method.

In the present exemplary embodiment, jobs in which image data are input into the digital MFP 101, such as a scan job, a copy job, a print job, and a facsimile job, are hereinafter collectively referred to as an "input job". In addition, the digital MFP 101 in the present exemplary embodiment can store image data obtained by scanning or via facsimile transmission, on the HDD to later print the stored image data or send the stored image data to an external device according to an output instruction from the user. Jobs generated according to an instruction for outputting (printing and sending) an image stored in the digital MFP 101 are hereinafter collectively referred to as an "output job".

When an output job for outputting an image stored in the digital MFP 101 is executed, the image data for tracing is already generated and stored in the database server 103 at the time of storing the image in the digital MFP 101 (at the time of execution of the input job). Therefore, the job control domain unit 403, at the time of execution of an output job, can generate only log information without generating the image data for tracing and store the generated log information by associating the generated log information with the image data for tracing and the log information of the input job stored in the database server 103.

The service communication unit 404 sends a request command via a network I/F unit 405 to a data receiving unit 601 (FIG. 6) in the image processing server 102, using a Simple Object Access Protocol (SOAP) on an HyperText Transport Protocol (HTTP). The service communication unit 404 then receives a response to the request. The network I/F unit 405 is connected to the network 109 and performs processing of a network protocol such as TCP/IP.

Figure 5:
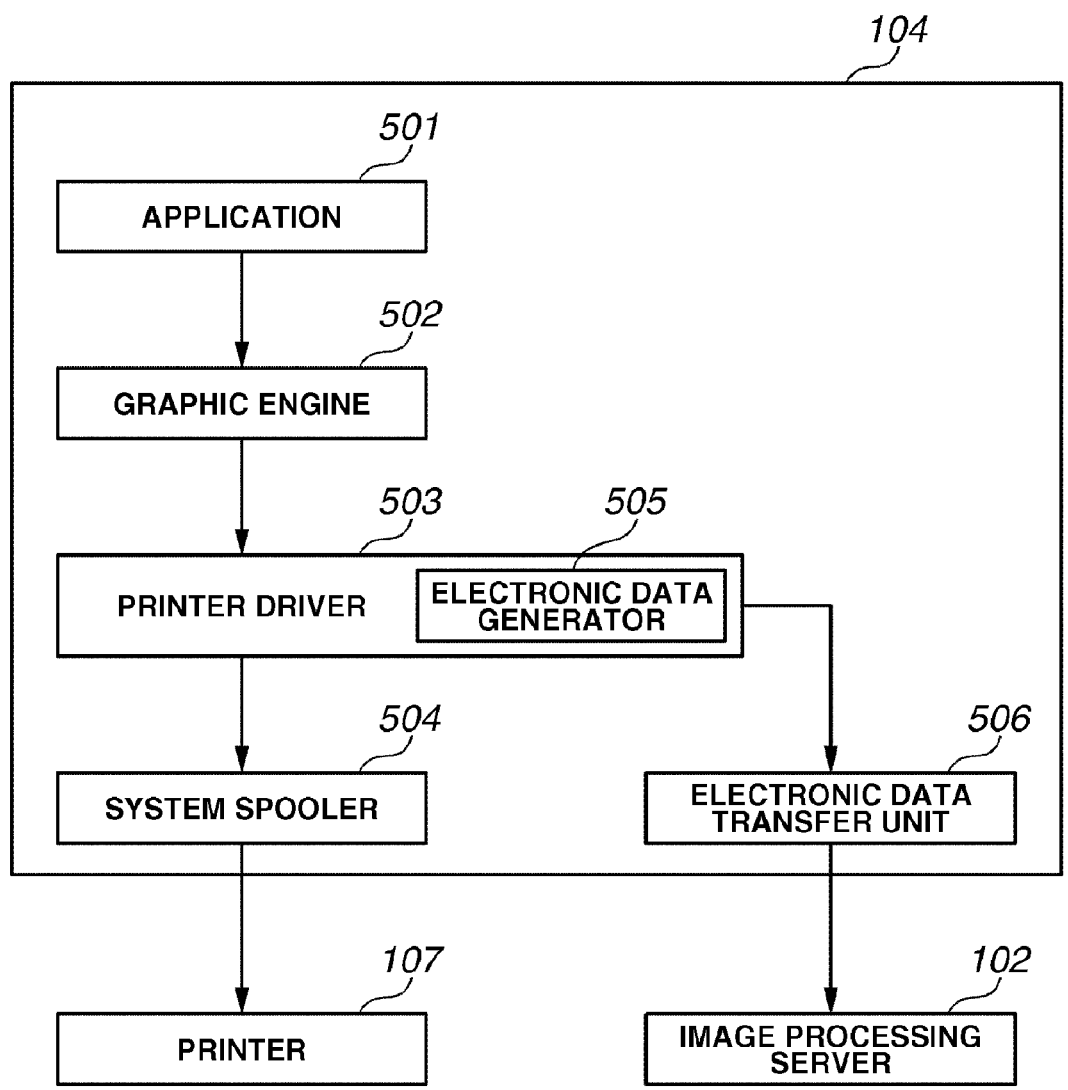
FIG. 5 illustrates a functional configuration of software of a user PC according to an exemplary embodiment of the present invention.

FIG. 5 illustrates an exemplary configuration of print processing performed by the user PC 104. Referring to FIG. 5, an application 501, a graphic user engine 502, a printer driver 503, and a system spooler 504 exist in the HDD of the user PC 104 in the form of software programs. These are program modules that are loaded onto the RAM 203 to be executed by a module such as an operating system (OS).

The application 501 and the printer driver 503 can be stored in a floppy disk (FD) and a compact disk-read only memory (CD-ROM), and on the HDD 204 via a network. The application 501 stored on the HDD 204 is loaded onto the RAM 203 and executed. In performing printing according to the application 501 with the printer 107, the graphic engine 502 loaded executable on the RAM 203 is used to perform outputting (or rendering).

The graphic engine 502 loads the printer driver 503 provided to each printing apparatus (such as a printer) from the HDD 204 onto the RAM 203. In addition, the graphic engine 502 transmits the data output from the application 501 to the printer driver 503. Furthermore, the graphic engine 502 converts the graphic device interface (GDI) function received from the application 501 into a device driver interface (DDI) function and outputs the converted function to the printer driver 503.

The printer driver 503 converts the received data into a control command that can be interpreted by the printer, such as a page description language (PDL), according to the DDI function received from the graphic engine 502. The converted printer control command is output to the printer 107 as print data via the system spooler 504.

The printing system according to the present exemplary embodiment includes an electronic data generator 505 inside the printer driver 503. The electronic data generator 505 can be a build-in module of the printer driver 503, or can be a library module that is added by a separate installation. In the printer driver 503, the electronic data generator 505 extracts and generates tracing data, and then sends the generated tracing data to the electronic data transferring unit 506. The data to be stored as tracing data includes image data, text data, and log information. Furthermore, the electronic data generator 505 can determine whether to extract text data from the DDI function according to the application 501.

The electronic data transferring unit 506 receives the tracing data and transfers the received tracing data to the image processing server 102. The electronic data transferring unit 506 can process and classify the received tracing data as necessary. In addition, the electronic data transferring unit 506 can send the tracing image data to the image processing server 102 immediately after receiving the tracing data. Alternatively, the electronic data transferring unit 506 can temporarily store the received tracing data in an HDD and send the stored tracing data to the image processing server 102 according to a sending schedule separately specified.

Figure 6:
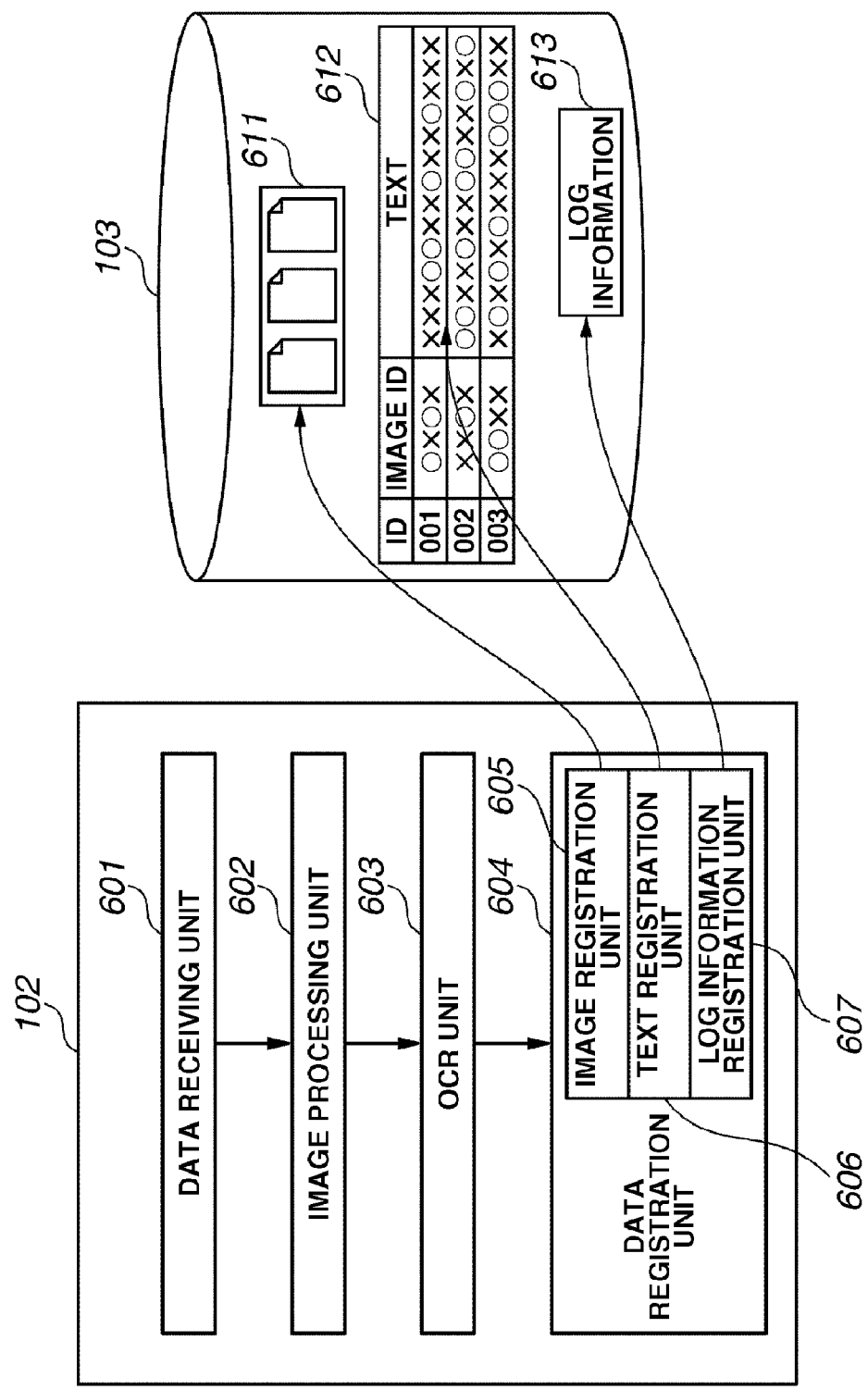
FIG. 6 illustrates a configuration of an image processing server and a structure of data stored in a database server according to an exemplary embodiment of the present invention.

FIG. 6 illustrates an exemplary configuration of the image processing server 102 and an exemplary structure of data stored in the database server 103.

Referring to FIG. 6, a data receiving unit 601 receives image data, text data, and log information transferred from the digital MFP 101 or the user PC 104 and sends the received data and information to an image processing unit 602.

The image processing unit 602 converts the received image data into a format with which the image data can be stored in the database server 103. If image conversion is not necessary, the image processing unit 602 does not convert the received image data. A plurality of image data can exist in one job. Such image data can be compiled into one format such as portable document format (PDF). The image data can also be stored in a plurality of pieces in JPEG format, as long as the data can be interpreted by the database server 103 job by job. For the sake of simplicity, the present exemplary embodiment will describe a case where one image data exists in one job.

The image processing unit 602 checks whether text data corresponding to the image data exists. The image data that does not include text data is then sent to an OCR processing unit 603. On the other hand, if the image data includes text data, the image processing unit 602 sends the image data and the text data to a data registration unit 604.

The OCR processing unit 603 performs OCR on the image data to extract text data. Then, the OCR processing unit 603 sends the image data and the text data to the data registration unit 604.

The data registration unit 604 includes an image registration unit 605, a text registration unit 606, and a log information registration unit 607. The image registration unit 605 registers image data on the database server 103 as a file. The text registration unit 606 registers text data on the database server 103 as a text which is used in a full-text search. The log information registration unit 607 registers log information that describes the content of a job on the database server 103.

Image data 611 is registered by the data registration unit 604. A method for registering the image data is appropriately defined according to a database system to be used. For example, each image data can be provided with an image identification (ID) and the image data having a unique image ID can be managed using a table, as described below.

A job management table 612 includes an ID for identifying a job, an image data ID corresponding to the job, and text data corresponding to the job. The text data is used in a full-text search by assigning a search index. The text registration unit 606 registers text data in a text column of the job management table 612. Attributes of the job management table 612 are not limited to those described above, and other attributes related to the job can be included.

Moreover, the database server 103 uses a log information table 613 corresponding to a job to execute management, for example, what processing has been performed on the job. Further description thereof is omitted in the present exemplary embodiment.

Figure 7:
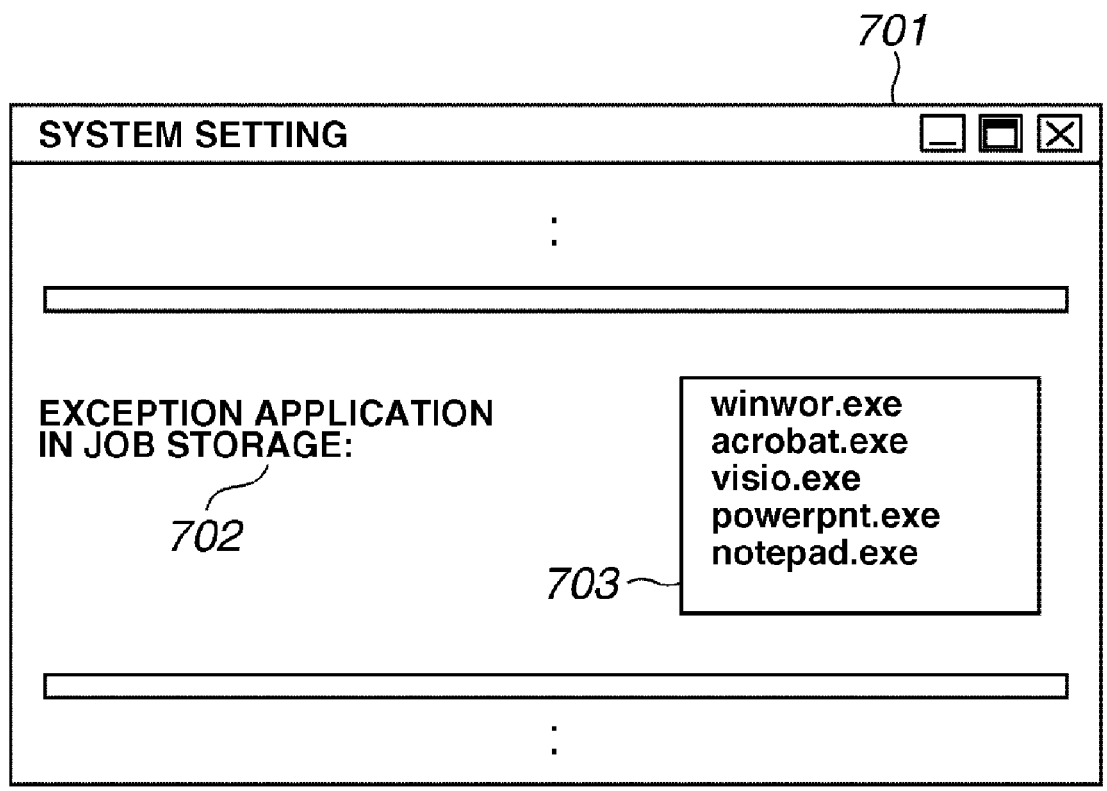
FIG. 7 illustrates a system setting user interface (UI) according to an exemplary embodiment of the present invention.

FIG. 7 illustrates an example of a setting screen user interface (UI) used for performing a system management setting according to an exemplary embodiment. The UI can operate, for example, on the image processing server 102, the database server 103, or on another PC. Referring to FIG. 7, a system setting window 701 is displayed by a stand-alone application or a web application, and an embodiment therefor is not specifically limited. For example, a schedule for sending data from the digital MFP 101 and the user PC 104 to the image processing server can be set in the system setting. The resolution, compression rate, or number of bits of image data can also be set in the system setting.

In addition, a user can use the system setting window 701 to determine whether the printer driver 503 is to extract a text according to the application that performs printing. In the present exemplary embodiment, in a default setting, the printer driver 503 extracts text data from a text print command. However, the system can be set such that the printer driver 503 does not perform text extraction according to a type of the application. FIG. 7 illustrates a UI via which an application can be set as an exception application. Here, the application extracts a text by allowing the image processing server 102 to perform OCR on the image data without allowing the printer driver 503 to extract a text.

The exception application is set via an exception application setting field 702 in the system setting window 701. The applications displayed in a text box 703 are set as exception applications. The electronic data generator 505 in the printer driver 503 installed in all user PCs are notified of the exception applications set in the system setting field 702. The setting becomes valid for a subsequent printing operation. A list of the notified exception applications can be stored in the user PC as a file or in a registry. The above-described setting can be performed for each user PC or for each printer driver.

Figure 8:
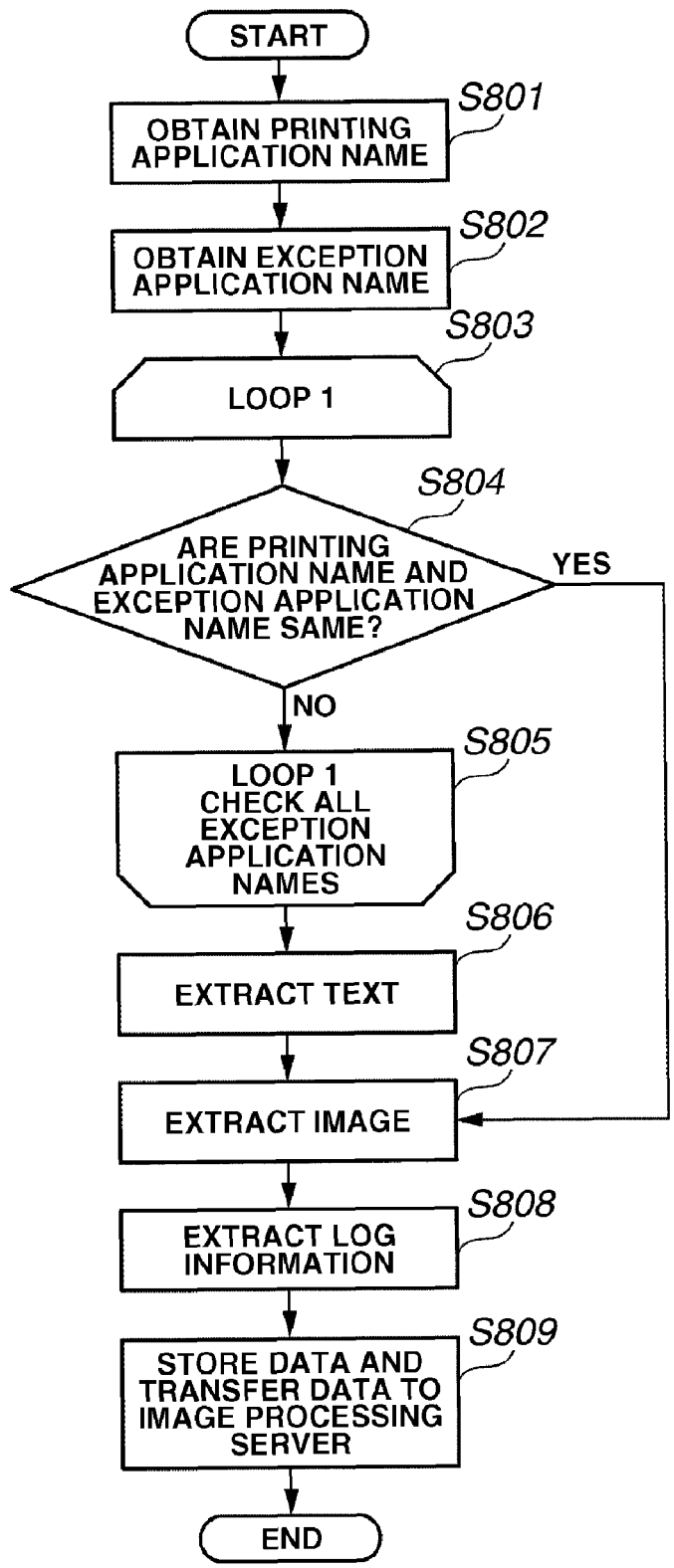
FIG. 8 is a flow chart illustrating an operation performed by a user PC in print processing according to an exemplary embodiment of the present invention.

FIG. 8 is a flow chart illustrating an operation for storing tracing data performed by the user PC 104 in print processing according to an exemplary embodiment Referring to FIG. 8, when the user generates an instruction for starting print processing, the printer driver 503 receives the instruction to start print processing. At the same time, the electronic data generator 505 in the printer driver 503 acquires an application name (i.e., the name of the module that performs printing) of the application 501 (step S801).

The electronic data generator 505 then acquires the name of the exception application set as described above (step S802). If a plurality of exceptional applications is set, the electronic data generator 505 acquires the names of all the registered exception applications.

The electronic data generator 505 then determines whether the name of the printing application acquired in step S801 and the name of the exception application acquired in step S802 match with each other (step S804). If it is determined in step S804 that the exception application having the same name as the printing application exists (YES in step S804), then the electronic data generator 505 ends a loop 1 and advances to step S807. In step S807, the electronic data generator 505 extracts and generates an image. In step S805, the electronic data generator 505 determines whether the names of all exceptional applications have been collated with the name of the printing application acquired in step S801. If it is determined in step S805 that the names of all exceptional applications have not yet been collated with the name of the printing application acquired in step S801, then the electronic data generator 505 returns to step S803. On the other hand, if it is determined in step S805 that the names of all exceptional applications have been collated but no exception application having the same name as the printing application acquired in step S801 exists, then the electronic data generator 505 advances to step S806. In step S806, the electronic data generator 505 extracts text data from the text rendering command (print command). Subsequently, the electronic data generator 505 extracts and generates a log image (image data for tracing) (step S807).

In step S808, the electronic data generator 505 extracts log information of the print processing (i.e., information about when, where, and by whom the print processing was performed).

In step S809, the electronic data generator 505 temporarily stores the extracted data in an internal storage device and transfers the stored data to the image processing server 102 according to a predetermined schedule. Here, when a setting is such that the extracted data is immediately sent, the electronic data generator 505 immediately sends the extracted data to the electronic data transferring unit 506. Then, the electronic data transferring unit 506 sends the received data to the image processing server 102.

When a print job is performed as described above, information about the job (i.e., tracing image data, log information, and text data for confirming the printed image) is stored in the database server 103 via the image processing server 102. Accordingly, a user can later verify what kind of job has been performed. Furthermore, in the case of information leakage, the user can easily trace the job that caused the leakage. Moreover, a method for extracting text data can be changed according to the type of application. Accordingly, more accurate text data can be extracted.

Figure 9:
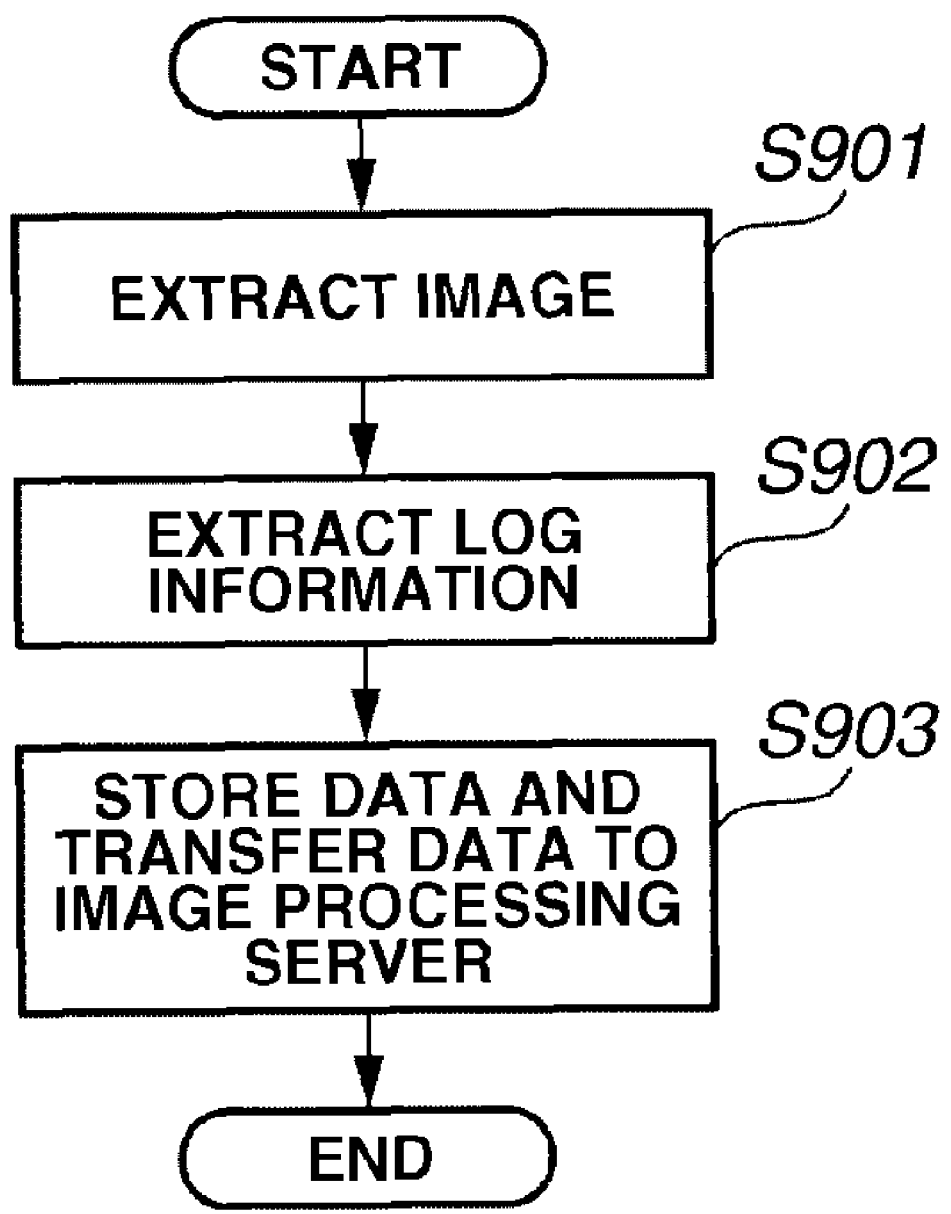
FIG. 9 is a flow chart illustrating an operation performed by a digital MFP in executing a job according to an exemplary embodiment of the present invention.

FIG. 9 is a flow chart illustrating an operation performed by the digital MFP 101 in executing a job according to an exemplary embodiment. Now, the processing for extracting tracing data and storing the extracted tracing data in a database, which is performed during the execution of a job, will be described below with reference to the flow chart of FIG. 9.

Referring to FIG. 9, when a job for inputting an image (an input job such as a scan job) into the digital MFP 101 is executed, the job control domain unit 403 extracts and generates image data for tracing the job (step S901).

In step S902, the job control domain unit 403 extracts the log information at the time of execution of the job (i.e., information about when, where, and by whom the job was executed) The job control domain unit 403 extracts log information in both cases where a job for inputting an image in the digital MFP 101 is executed and where a job for outputting an image stored in the digital MFP 101 is executed.

In step S903, the data (image data for tracing and log information) extracted by the job control domain unit 403 is temporarily stored in an internal storage device. The stored data is transferred to the image processing server 102 according to a predetermined schedule. The data can be immediately transferred when the data is set to be immediately sent. Moreover, the log information is transferred to the image processing server 102 together with the ID of the input job in the case of an output job.

As described above, the information about the job performed by the digital MFP 101 is stored in the database server 103 via the image processing server 102. Accordingly, a user can verify the job later. In the present exemplary embodiment, the processing performed on the job processed by the digital MFP 101 is described with reference to the example illustrated in FIG. 9. However, the processing is not limited to the processing performed by the digital MFP 101. That is, processing similar to the processing illustrated in FIG. 9 can be performed on a job executed by other image processing apparatus such as a printer or a facsimile.

Figure 10:
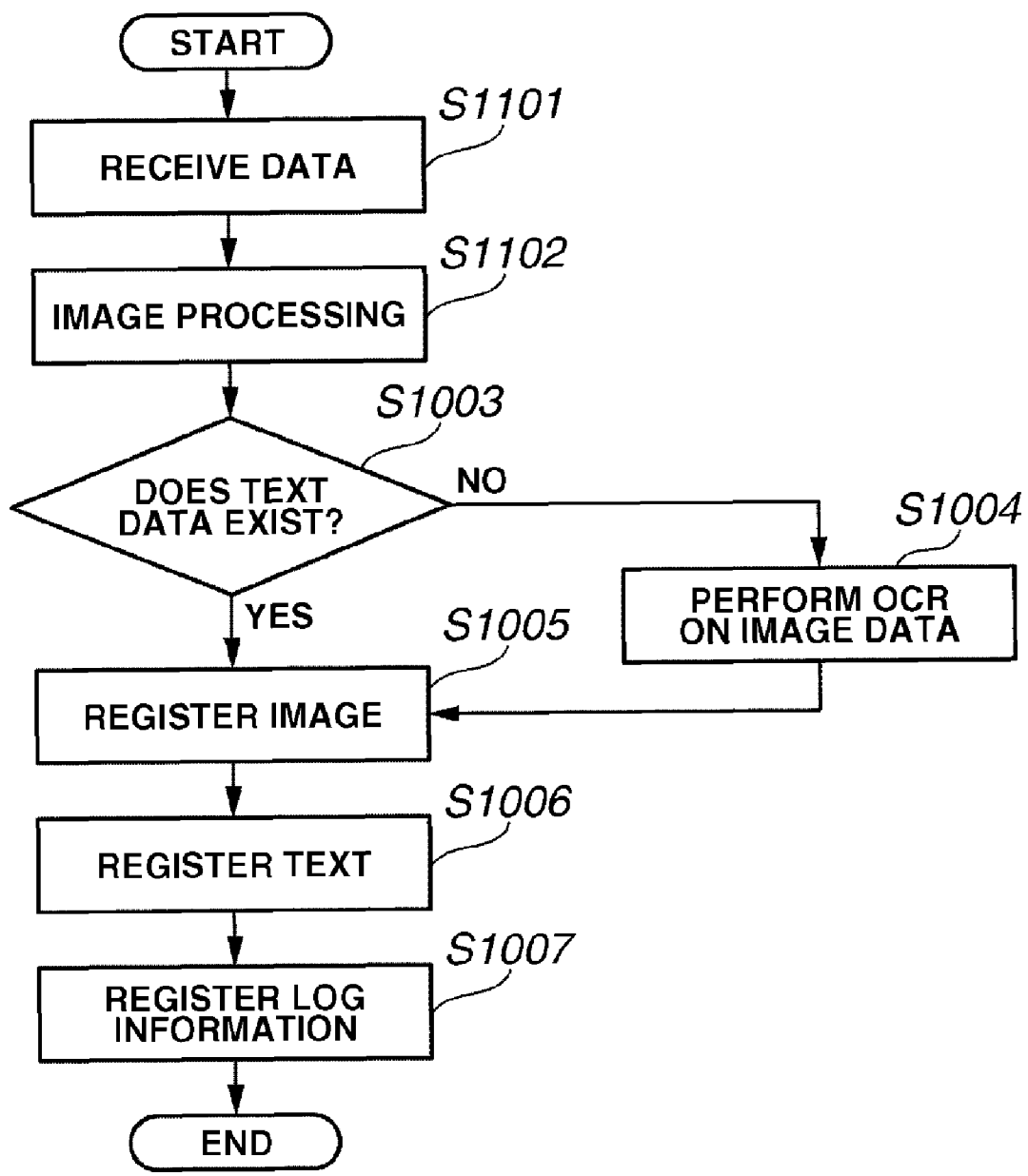
FIG. 10 is a flow chart illustrating a series of operations from image processing to data registration performed by the image processing server according to an exemplary embodiment of the present invention.

FIG. 10 is a flow chart illustrating a flow of processing performed by the image processing server 102 according to an exemplary embodiment.

Referring to FIG. 10, in step S1001, the data receiving unit 601 receives data (image data for tracing, text data, and log information) transferred from the digital MFP 101 and the user PC 104.

In step S1002, the image processing unit 602 converts the tracing image data received by the data receiving unit 601 into an image format with which the data can be registered on the database server 103.

In step S1003, the image processing unit 602 determines whether text data corresponding to the image data has been received. If it is determined in step S1003 that text data corresponding to the image data has not been received yet (NO in step S1003), then the processing advances to step S1004. In step S1004, the OCR processing unit 603 performs OCR on the received image data, extracts a text, and sends the extracted text to the data registration unit 604. On the other hand, if it is determined in step S1003 that text data corresponding to the image data has been received (YES in step S1003), then the image processing unit 602 directly sends the image data and the text data to the data registration unit 604. The order of image processing in step S1002 and the OCR processing in step S1004 can be reversed.

In step S1005, the image registration unit 605 registers the tracing image data on the database server 103.

In step S1006, the text registration unit 606 registers the received text data or the OCR-extracted text data on the job management table 612 in the database server 103. Here, the text data is registered as a text for a full-text search corresponding to the image data registered in step S1005.

In step S1007, the log information registration unit 607 registers the received log information in the job management table 612 in the database server 103.

As described above, when text data is not sent, OCR processing is performed on the image data, and the OCR-processed data is registered in the database server. Accordingly, the user can easily perform a search. In addition, when text data is sent, OCR processing is not performed. Thus, text data is not redundantly generated.

In the case where the image data for tracing is subjected to image conversion processing such as resolution conversion, the digital MFP 101, the user PC 104, and the image processing server 102 can perform such processing within the scope of the present invention.

The exemplary embodiments of the present invention have been described with reference to the drawings. However, the above-described diagrams and flow charts each illustrate only an example, and the present invention is not limited to the above-described exemplary embodiments.

Note that the present invention can be implemented by directly or remotely supplying a program of software implementing functions of the above-described exemplary embodiments (in the exemplary embodiments, the program corresponding to the processing performed according to the flow charts in the drawings) to a system or an apparatus, so that a computer of the apparatus and the system reads and executes supplied program codes. Accordingly, the program code itself, which is installed to the computer that implements the functional processing of the present invention, realizes the present invention. That is, the present invention also includes the computer program implementing the functional processing of the present invention.

The program can be configured in any form, such as object code, a program executed by an interpreter, and script data supplied to an OS.

As the recording medium for supplying such program code, a magnetic disk, an optical disk, a magneto-optical disk, a magnetic tape, and a nonvolatile memory card, for example, can be used.

The above program can also be supplied by connecting to a web site on the Internet using a browser of a client computer and by downloading the program from the web site to a recording medium such as a hard disk. In addition, the above program can also be supplied by downloading a compressed file that includes an automatic installation function, from the web site to a recording medium such as a hard disk. The functions of the above embodiments can also be implemented by dividing the program code into a plurality of files and downloading each divided file from different web sites. That is, a WWW server for allowing a plurality of users to download the program file for implementing the functional processing constitutes the present invention.

In addition, the functions according to the embodiments described above can be implemented not only by executing the program code read by the computer, but also implemented by the processing in which an OS (operating system) or the like carries out a part of or the whole of the actual processing based on an instruction given by the program code.

Further, in another aspect of the embodiment of the present invention, after the program code read from the recording medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-183015 filed Jul. 3, 2006, which is hereby incorporated by reference herein in its entirety.

What is claimed is:

1. A data management system, comprising:
a client apparatus including:
a setting unit configured to individually set, for each printing application of a plurality of printing applications, whether that printing application is an exception application, wherein an extraction unit of the client apparatus is configured to not extract text data from a print rendering command output from a printing application set as an exception application;
a receiving unit configured to receive a print rendering command output from a first printing application as part of a print processing of the first printing application;
a determining unit configured to determine whether the first printing application is an exception application;
an extraction unit configured to extract text data from the received print rendering command in response to determining that the first printing application is not an exception application, and configured to not extract text data from the received print rendering command in response to determining that the first printing application is an exception application, and configured to extract image data from the received print rendering command;
a sending unit configured to perform control to send extracted image data and any extracted text data to an image processing server;
a database; and
the image processing server, wherein the image processing server includes:
a receiving unit configured to receive the extracted image data and any extracted text data sent from the client apparatus;
a determining unit configured to determine whether text data corresponding to the received extracted image data has been received by the image processing server;
an optical character recognition unit configured to perform, in response to determining that text data corresponding to the received extracted image data has not been received by the image processing server, optical character recognition processing on the received extracted image data to extract text data from the received extracted image data and configured to not perform, in response to determining that text data corresponding to the received extracted image data has been received by the image processing server, optical character recognition processing on the received extracted image data so as to not extract text data from the received extracted image data; and
a registration unit configured to register, in response to determining that text data corresponding to the received extracted image data has not been received by the image processing server, the received extracted image data and the text data extracted by the optical character recognition unit in association with the received extracted image data in the database, and to register, in response to determining that text data corresponding to the received extracted image data has been received by the image processing server, the received extracted image data and the received text data in association with the received extracted image data in the database.

2. The data management system according to claim 1, wherein the extraction unit in the client apparatus is implemented by a printer driver.

3. The data management system according to claim 1, further comprising an image processing apparatus,
wherein the image processing apparatus includes a second sending unit configured to send second image data related to a job executed by the image processing apparatus to the image processing server,
wherein the receiving unit of the image processing server further receives the second image data that has been sent by the second sending unit, wherein the optical character recognition unit further extracts second text data by performing optical character recognition processing on the second image data received by the receiving unit of the image processing server, and
wherein the registration unit further is configured to register, in the database, the second image data in association with the second text data.

4. The data management system according to claim 1, wherein the image processing server performs control so that extracted text data, the extracted image data, and log information are associated with one another to be registered in the database.

5. The data management system according to claim 1, wherein the sending unit is further configured to directly send, in response to determining that text data corresponding to the received extracted image data has been received by the image processing server, the received extracted image data and the received extracted text data to the registration unit of the image processing server.

6. A client apparatus, comprising:
a setting unit configured to individually set, for each printing application of a plurality of printing applications, whether that printing application is an exception application, wherein an extraction unit of the client apparatus is configured to not extract text data from a print rendering command output from a printing application set as an exception application;
a receiving unit configured to receive a print rendering command output from a first printing application as part of a print processing of the first printing application;
a determining unit configured to determine whether the first printing application is an exception application;
an extraction unit configured to extract text data from the received print rendering command in response to determining that the first printing application is not an exception application, and configured to not extract text data from the received print rendering command in response to determining that the first printing application is an exception application, and configured to extract image data from the received print rendering command; and
a sending unit configured to perform control to send extracted image data and any extracted text data to an image processing server.

7. An image processing server connected to a client apparatus, the image processing server comprising:

a receiving unit configured to receive information about a print job performed by the client apparatus, wherein the information includes at least image data processed in the print job;
a determining unit configured to determine whether text data is included in the information received by the receiving unit;
an optical character recognition unit configured to perform, in response to determining that no text data is included in the information received by the receiving unit, optical character recognition processing on the image data included in the received information to extract text data from the received information and configured to not perform, in response to determining that text data is included in the information received by the receiving unit, optical character recognition processing on the image data included in the received information so as to not extract text data from the received information; and
a registration unit configured to register, in response to determining hat no text data is included in the information received by the receiving unit, the received image data and the text data extracted by the optical character recognition unit in association with the image data in the database, and to register, in response to determining that text data is included in the information received by the receiving unit, the received image data and the received text data in association with the received image data in the database,
wherein the client apparatus includes:
a setting unit configured to individually set, for each printing application of a plurality of printing applications, whether that printing application is an exception application, wherein an extraction unit of the client apparatus is configured to not extract text data from a print rendering command output from a printing application set as an exception application;
a receiving unit configured to receive a print rendering command output from a first printing application as part of a print processing of the first printing application;
a determining unit configured to determine whether the first printing application is an exception application;
an extraction unit configured to extract text data from the received print rendering command in response to determining that the first printing application is not an exception application, and configured to not extract text data from the received print rendering command in response to determining that the first printing application is an exception application, and configured to extract image data from the received print rendering command; and
a sending unit configured to perform control to send extracted image data and any extracted text data to an image processing server.

8. A method for a data management system, the method comprising:
individually setting, in a client apparatus and for each printing application of a plurality of printing applications, whether that printing application is an exception application, wherein extracting in the client apparatus is configured to not extract text data from a print rendering command output from a printing application set as an exception application;
receiving, in the client apparatus, a print rendering command output from a first printing application as part of a print processing of the first printing application;
determining, in the client apparatus, whether the first printing application is an exception application;

extracting, in the client apparatus, text data from the received print rendering command in response to determining that the first printing application is not an exception application, and not extracting, in the client apparatus, text data from the received print rendering command in response to determining that the first printing application is an exception application;

extracting, in the client apparatus, image data from the received print rendering command;

performing control, in the client apparatus, to send extracted image data and any extracted text data to an image processing server;

receiving, in the image processing server, the extracted image data and any extracted text data sent from the client apparatus;

determining, in the image processing server, whether text data corresponding to the received extracted image data has been received by the image processing server;

performing, in the image processing server and in response to determining that text data corresponding to the received extracted image data has not been received by the image processing server, optical character recognition processing on the received extracted image data to extract text data from the received extracted image data and not performing, in response to determining that text data corresponding to the received extracted image data has been received by the image processing server, optical character recognition processing on the received extracted image data so as to not extract text data from the received extracted image data; and registering, using a registration unit of the image processing server, the extracted image data and the extracted text data in association with the extracted image data in a database.

9. The method according to claim 8, wherein the image data is associated with the print rendering command that is output during the print processing by the first printing application.

10. A non-transitory computer-readable storage medium storing a program that causes a data management system including a client apparatus, an image processing server, and a database to perform the method according to claim 8.

11. A method for controlling a client apparatus, the method comprising:

individually setting, for each printing application of a plurality of printing applications, whether that printing application is an exception application, wherein extracting in the client apparatus is configured to not extract text data from a print rendering command output from a printing application set as an exception application;

receiving a print rendering command output from a first printing application as part of a print processing of the first printing application;

determining whether the first printing application is an exception application;

extracting text data from the received print rendering command in response to determining that the first printing application is not an exception application, and not extracting, in the client apparatus, text data from the received print rendering command in response to determining that first printing application is an exception application;

extracting image data from the received print rendering command;

performing control to send extracted image data and any extracted text data to an image processing server.

12. The method according to claim 11, wherein the image data is associated with the print rendering command that is output during the print processing by the first printing application.

13. A non-transitory computer-readable storage medium storing a program that causes a client apparatus to perform the method of claim 11.

14. The non-transitory computer-readable storage medium according to claim 13, wherein the image data is associated with the print rendering command that is output during the print processing by the first printing application.

* * * * *